United States Patent [19]

Bowles et al.

[11] Patent Number: 4,549,644
[45] Date of Patent: Oct. 29, 1985

[54] ARTICLE ACCUMULATOR AND TRANSFER SYSTEM AND METHOD

[75] Inventors: Patrick J. Bowles; Lloyd W. Garrett, both of Louisville, Ky.

[73] Assignee: General Electric Company, Louisville, Ky.

[21] Appl. No.: 504,461

[22] Filed: Jun. 15, 1983

[51] Int. Cl.$^4$ .............................................. B65G 43/00
[52] U.S. Cl. ................................... 198/341; 198/464.1
[58] Field of Search ............... 198/341, 358, 460, 466, 198/469, 470, 482, 486, 796

[56] References Cited

U.S. PATENT DOCUMENTS

| | | | |
|---|---|---|---|
| 2,353,638 | 7/1944 | Beaulieu et al. | 198/339 |
| 2,636,591 | 4/1953 | Galper | 198/580 |
| 2,932,376 | 4/1960 | Millington | 198/347 |
| 2,987,201 | 6/1961 | Abbey | 214/89 |
| 3,260,349 | 7/1966 | Vander Meer | 198/350 |
| 3,527,087 | 9/1970 | Converse, III et al. | 73/117.3 |
| 3,797,423 | 3/1974 | Lopez et al. | 112/121.11 |
| 3,805,942 | 4/1974 | Auernhammer | 198/339 |
| 3,845,286 | 10/1974 | Aronstein et al. | 235/151.1 |
| 3,858,519 | 1/1975 | Masino et al. | 104/88 |
| 3,915,284 | 10/1975 | Knockeart et al. | 198/34 |
| 3,943,343 | 3/1976 | Irie | 235/151 |
| 3,952,388 | 4/1976 | Hasegawa et al. | 29/33 |
| 4,157,206 | 6/1979 | Ikeda et al. | 316/27 |
| 4,195,347 | 3/1980 | MacMunn et al. | 364/478 |
| 4,240,148 | 12/1980 | Thoma | 364/478 |
| 4,287,459 | 9/1981 | Dahlstrom | 318/568 |
| 4,306,646 | 12/1981 | Magni | 198/341 |

Primary Examiner—Joseph E. Valenza
Attorney, Agent, or Firm—Frederick P. Weidner; Radford M. Reams

[57] ABSTRACT

An article accumulator and transfer system and method is provided for combining the transfer of articles from a loading station to an unloading station and the accumulation of articles to avoid prolonged, interrupted operation of the unloading station in the event the loading station is inoperative. The method includes a first primary operation which intermittently moves and stops a continuous conveyor having a plurality of article stations between the loading and unloading stations, placing articles on the conveyor at the loading station when the conveyor is stopped and there is no article on the conveyor article station at the loading station at a rate greater than the rate at which the articles are removed at the unloading station and removing articles from non-sequential article stations of the conveyor when at the unloading station and the conveyor is stopped. A secondary operation is provided in the event the loading station is inoperative and includes intermittently moving and stopping the continuous conveyor between loading and unloading stations, sensing each time the conveyor stops the presence or absence of articles in the article station at the unloading station and at the first preceding article station before the unloading station and sending a corresponding signal to an electronic control device, and selecting, as a function of the signals, moving the conveyor to bring the next preceding article station to the unloading station when an article is absent at the unloading station, and selecting, when an article is in the article station at the unloading station, which one as between the article station at unloading station and first immediately preceding article station thereto the article to be unloaded at the unloading station based on the logic of selecting the article at the unloading station when there is an article at the unload station and no article at the first preceding article station and selecting the article of the first preceding article station when there is an article at the unload station and the first preceding article station then removing the selected article at the unloading station.

26 Claims, 4 Drawing Figures

ARTICLE ACCUMULATOR AND TRANSFER SYSTEM AND METHOD

BACKGROUND OF THE INVENTION

In-process accumulation systems such as for use in manufacturing assembly lines in general must have immediate recovery capabilities. That is, in the event the loading of articles ceases for a period of time less than the accumulation time, then the accumulator can recover its inventory and maintain the supply of articles to the unload device without interruption. Prior methods of in-process accumulation or inventory can be divided into two modes of operation; namely, synchronous and non-synchronous, both of which are well known in the manufacturing industries.

Synchronous accumulators generally employ a multifunction load device and multiple mechanisms to store and transfer parts or articles. The load device may have the ability to load either into the accumulator or directly into the unload station or unload device. Consequently, in the event the load device ceases to load parts or articles, the synchronous accumulator reverses its cycle and continues to supply parts to the unload station or device. One example of this is a vertical accumulator or stacker. The disadvantages of such an accumulator or stacker is in the cost of the multiple mechanisms required and non-independence of the load and unload devices; that is, the accumulation system must be operated according to the slowest work station and timing of the other work operations depends upon the slowest station. Further, there is no way in which work can be piled up ahead of a work station that may be temporarily out of order. That is, all of the work pieces or articles are moved simultaneously and intermittently by the conveyor.

Non-synchronous accumulators do allow for the random movement of parts within the accumulator. The load and unload stations can operate totally independent of each other without regard to cycle time. The articles used in this type of accumulator generally must be transferred as by pallets or mass accumulated on a conventional, continuous moving conveyor such as a chain, belt or similar conveyor or stacked in a first in, first out queue. Disadvantages of non-synchronous accumulators is that they require costly fixed pallets which may be returned to the load station or the articles must be limited to a geometric shape which can be independently moved in an oriented stable fashion. In some such conveyors pallets which carry the work pieces or articles are clutched to and declutched from a continuously moving conveyor chain. Successive pallets can be stacked up behind any given station by being declutched from the chain until space in the station becomes available. The problem with this type of system is that the backup pallets tend to be expensive. The clutching and declutching devices are prone to wear out and shock absorbing devices are required to absorb the stress of sudden clutching and declutching.

In an article conveyor system it is desirable to utilize the advantages of both synchronous and non-synchronous accumulation systems. That is, the conveyor system should provide both the storage and transfer of articles from a load station to an unloading station particularly in an automated assembly line. The total system should provide for combining the use of totally independent and dedicated robotic load and unload devices of non-similar cycle times yet has immediate recovery capabilities.

By this invention an accumulator and transfer system is provided which accomplishes the above desired qualities.

SUMMARY OF THE INVENTION

The invention provides an article accumulator and transfer system and a method of combining the transfer of articles from a loading station to an unloading station and the accumulation of articles to avoid prolonged interrupted operation of the unloading station in the event the loading station is inoperative. The method includes a first primary operation including intermittently moving and stopping a continuous conveyor having a plurality of article stations between the loading and unloading stations and placing articles on the conveyor at the loading station when the conveyor is stopped and there is no article on the conveyor at the loading station at a rate greater than the rate at which the articles are removed from the unloading station. The articles are then removed from non-sequential article stations of the conveyor when at the unloading station and the conveyor is stopped. There is also provided a secondary operation in the event the loading station is inoperative and includes continued intermittently moving and stopping the continuous conveyor between the loading and unloading station and sensing each time the conveyor stops the presence or absence of articles at the unloading station and at the first preceding article station before the unloading station and sending a corresponding signal to an electronic control device. As a function of the signals a selection is made as to moving the conveyor to bring the next preceding article station to the unloading station when an article is absent at the unloading station, and selecting when an article is at the unloading station which one as between the article station at the unloading station and first immediately preceding article station thereto the article to be unloaded from the article station when at the unloading station based on the logic of selecting the article at the unloading station when there is an article at the unloading station and no article at the first preceding article station and selecting the article of the first preceding article station when there is an article at the unloading station and the first preceding article station. The selected article is removed when at the unloading station.

By this system and method there are no large gaps between articles on the conveyor which contribute to the successful and reliable accumulation and transfer of articles. The system and method provides for immediate recovery and uninterrupted supply of articles to the unload station in the event the loading station is inoperative and restarts within the accumulation time period. If the gaps between articles are kept small, the unload station is able to receive articles and convey them to the assembly line without a delay while the loading station malfunction is corrected and resumes its loading to accumulate parts on the transfer system. There also is provided by this method a system that may utilize totally independent and dedicated robotic load and unload devices of non-similar cycle times.

DESCRIPTION OF THE PREFERRED EMBODIMENT

Figure 1:
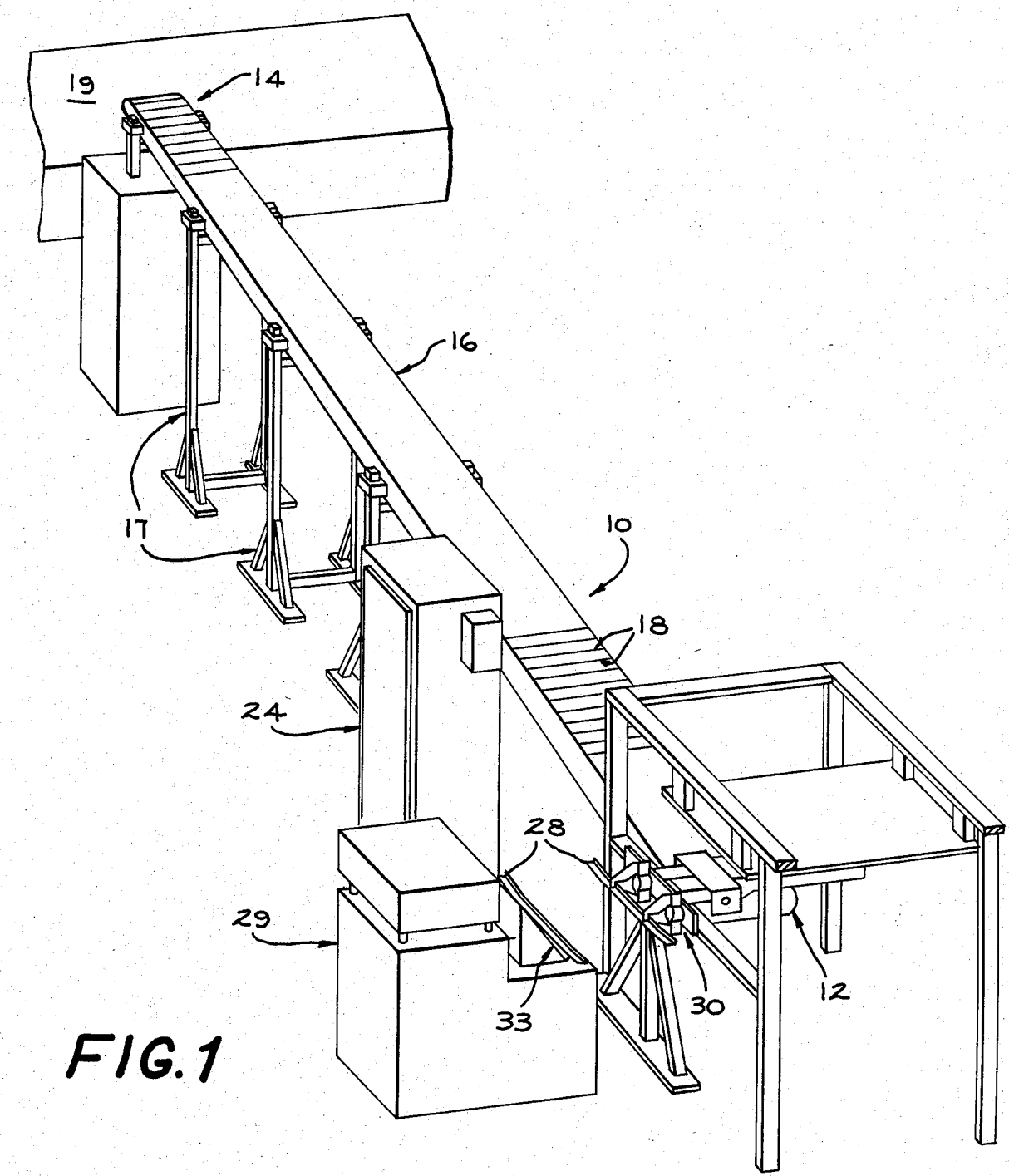
FIG. 1 is a schematic perspective view of conveyor apparatus utilizing the present invention.

The conveyor apparatus designated 10 generally comprises a loading station 12 at one end and an unloading station 14 at the opposite end with an endless or continuous conveyor 16 supported on stands 17 and movable at the top from the loading station 12 in the direction of the unloading station 14 and on the bottom returning from the unloading station 14 to the loading station 12. The endless conveyor 16 is moved in a step-wise movement; that is, it is intermittently moved and stopped. The continuous conveyor has a multiple number of part or article spaced apart stations 18 throughout its continuous length. The conveyor apparatus is utilized to supply parts or articles from one area of a production line to another area such as an assembly point 19 and have them available for use in assembling a product or appliance. In this conveyor apparatus the particular accumulation process or method can be implemented by using loading equipment at the loading station 12 whose loading rate is faster than the demand for articles by the unloading equipment at the unloading station 14 and using an article sensor 20 (FIG. 2) at the loading station 12 and three article sensors 22, 23 and 25 at the opposite end of the conveyor 16 for the unloading operation which send signals to an electronic control device, such as a programmable controller 24. The electronic control device 24 makes an intelligent selection of which article is to be unloaded to provide for a consistent supply of articles on demand, the logic of the selection will be discussed later.

Figure 2:
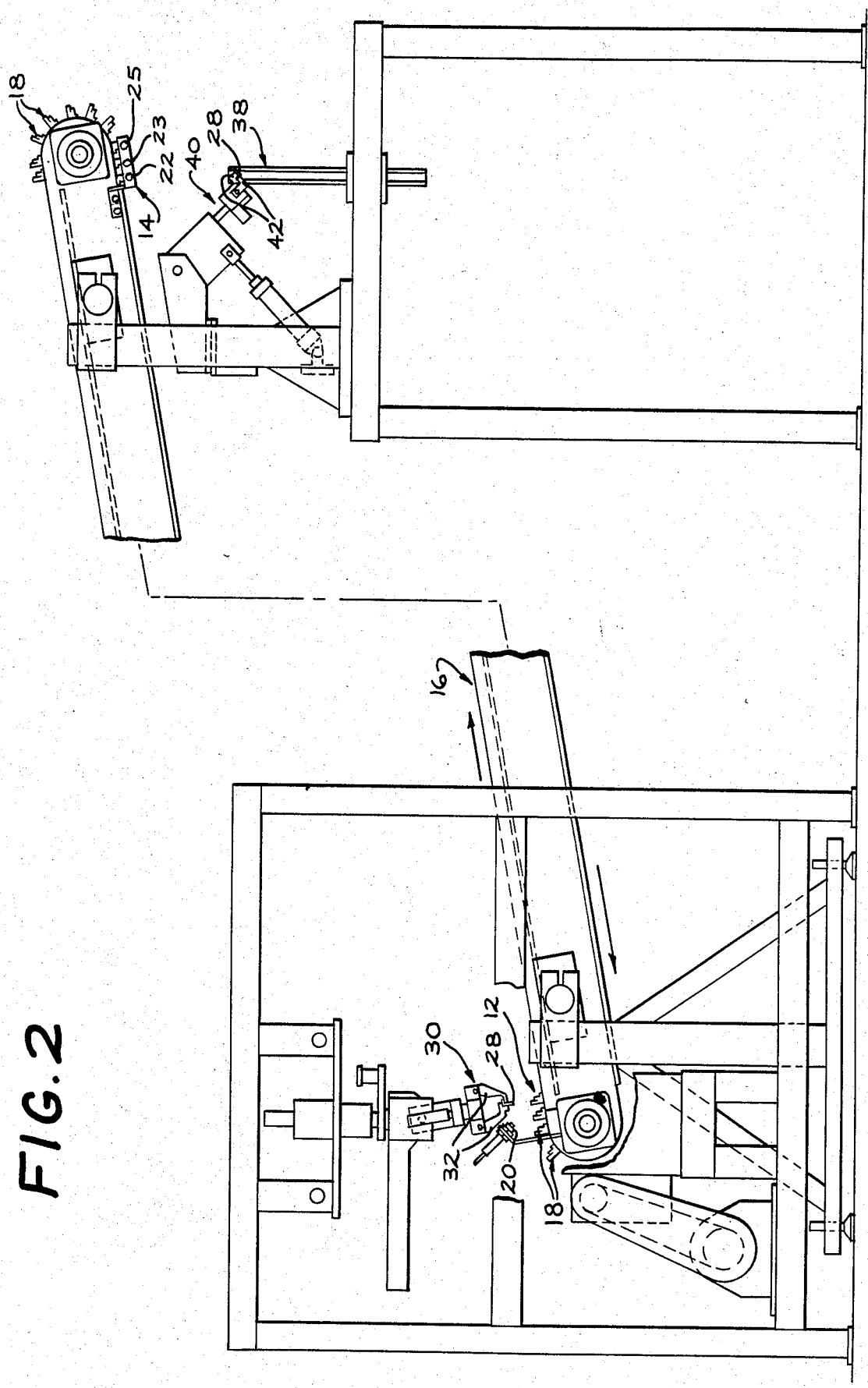
FIG. 2 is a side elevational view of the conveyor apparatus shown in FIG. 1 utilizing the present invention.
Figure 3:
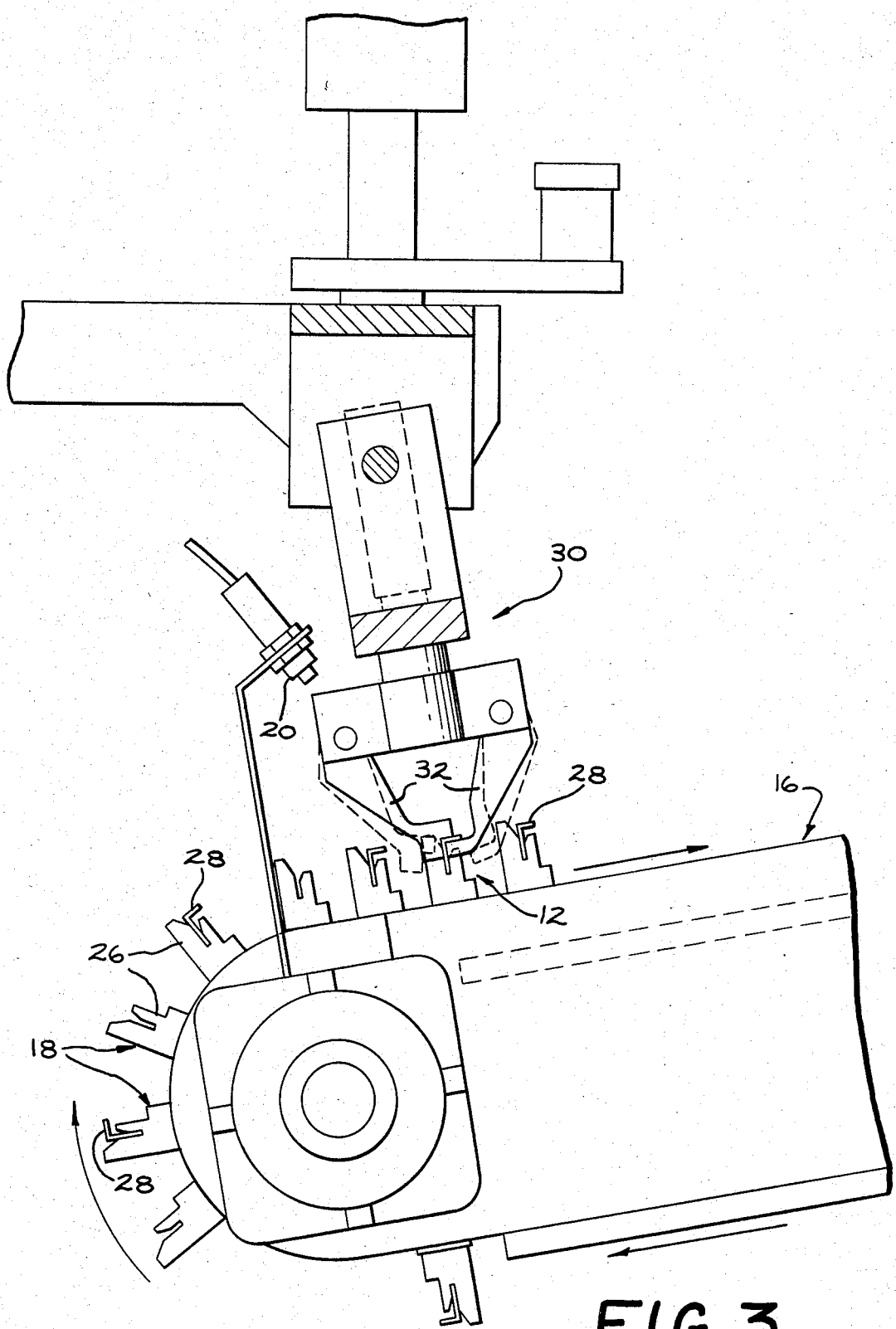
FIG. 3 is a side elevational view of a portion of the loading station of the conveyor apparatus shown in FIGS. 1 and 2.

With reference to FIG. 1 generally and shown in detail in FIGS. 2 and 3 the loading station 12 located at one end of the endless conveyor 16 is utilized for placing articles in the article stations 18 which in the preferred embodiment are equally spaced apart all along the continuous conveyor. Each article station 18 has a pair of article retainers 26, one on each side of the conveyor 16 so that between them an article 28 may be placed and retained by both until removed physically from the article stations 18 at the unloading station. At the loading station 12 articles 28 may be received from any source and in the preferred embodiment are received from a punch press 29 (FIG. 1) which forms the article, in this case from metal, to the desired shape and then is placed in a receptacle as an article supply source next to the punch press 29 from which the articles are removed and placed into the article retainers 26 at each article station as it stops at the load station 12 for delivery to the unload station 14. In the case of the preferred embodiment, a pick and place device or robot 30 with movable jaws 32 is programmed and directed by the electronic control device 24 to pick up from the article supply source such as the punch press 29 delivery bin 33 one article at a time and carry the article 28 to a position immediately above the conveyor 16. In the apparatus shown, the robot 30 after picking up the article 28 from the delivery bin 33 rotates 90° horizontally to a position where the article 28 is parallel to the article stations 18. There is provided near the loading station 12 a suitable sensor 20, such as a photo electric cell, which is utilized to sense whether or not each article station 18 has or does not have an article 28 in that station when it arrives at the loading station 12. As can be seen in FIG. 3 as the article stations 18 approach the loading station 12 from the direction indicated by arrows, some of the article stations 18 already carry or have retained therein articles 28. With the use of the sensor 20 the robot 30 is programmed not to place an article 28 into the article station 18 if that article station has an article 28 when it stops at loading station 12. When the sensor 20 indicates that the article station 18 is empty when the station stops at the loading station 12 the robot 30 will deliver an article 28 to that article station. The robot will carry the article 28 down and place the article 28 in the article retainers 26 and the jaws 32 of the robot 30 will open as indicated by dotted line in FIG. 3 thus completing delivery of the article 28 to the conveyor 16 at the loading station 12. After delivery of the article 28 the robot 30 returns to pick up another article 28 from the punch press delivery bin 33 and continue the sequence as called for by the electronic control device 24.

During the loading operation described above the endless conveyor 16 is intermittently moved in the direction of the arrows shown in FIGS. 2 and 3 and each article station 18 is stopped at the loading station 12. Thus, the conveyor moves in a step-wise movement which allows the robot 30 to place the articles 28 in the article stations 18 each time an empty article station 18 appears and stops at the load station 12. The loading capability at the loading station 12 should exceed the demand for articles 28 at the unload station 14. Thus under normal continued operation of the loading station 12 all empty article stations 18 are filled as they pass through the loading station 12.

Figure 4:
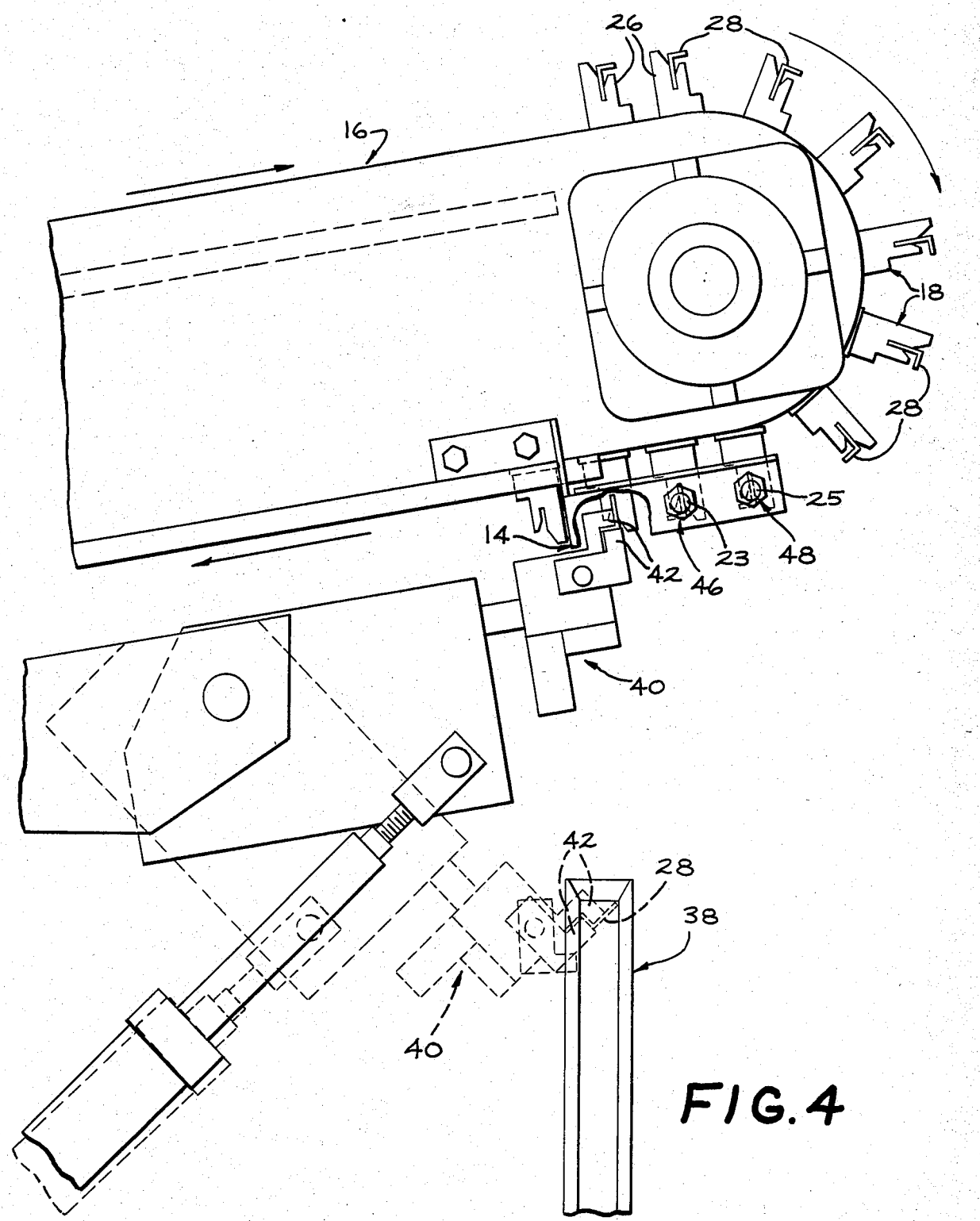
FIG. 4 is a side elevational view of the unloading station of the conveyor apparatus shown in FIGS. 1 and 2.

With reference generally to FIG. 1 and shown in detail in FIGS. 2 and 4 there is shown the unloading station 14 where the articles 28 are to be removed from the article retainers 26 on the conveyor 16 and deposited in an article receptacle 38 from which the articles will be used for assembling products or appliances. A robot 40 with jaws 42 is utilized for gripping the article 28 and by downward movement of the robot the article 28 is removed from the article retainers 26 at the unload station 14. By downward rotational movement of the robot 40 to the dotted line position shown in FIG. 4, the article 28 is moved to the article receptacle 38 and upon appropriate signal from the electronic control device 24 the jaws 42 of robot 40 open and the article 28 is released and deposited in the article receptacle 38. Upon signal from the electronic control device 24, the robot 40 then returns to the full line position shown in FIG. 4 to remove another article 28 from the endless conveyor 16. As was the case with the loading station 12, the endless conveyor 16 is intermittently moving through the unloading station 14 so that when the robot 40 is to grip the article 28 with its jaws 42, the conveyor is stopped and the article 28 is removed at the unloading station 14 before the conveyor is indexed another increment by the electronic control device.

Thus far described the conveyor apparatus 10 is performing its primary operation and the intermittent movement of the conveyor is controlled by the loading sequence at the loading station. However, in the conveying of articles the problem is when the loading station is down or inoperative for some period of time as it correspondingly causes the unloading station to be down since there are no articles being delivered by the conveyor under those circumstances. By this invention, however, there is provided means for storing or accumulating on the conveyor 16 articles 28 so that in the event the loading station 12 is prevented for one reason or another from supplying articles 28 to the endless conveyor 16 at the loading station 12 the unloading station 14 may continue its operation for a substantial amount of time so that the reason the loading station is inoperative, such as a malfunction at the punch press 29, may be detected and corrected. If the loading station is made operative within the accumulation time, the conveyor will immediately recover and in a short time all the conveyor article stations between the loading station and unloading station will be filled with articles 28. The combined transfer of articles from the loading station 12 to the unloading station 14 and the accumulation of articles on the conveyor 16 is accomplished by a method which includes as described above a first primary operation which is performed when the loading station 12 is operative and includes intermittently moving and stopping the continuous conveyor 16 having a plurality of article stations 18 between the loading station 12 and unloading station 14 and placing articles 28 on the conveyor at the loading station 12 when the conveyor is stopped and there is no article on the conveyor at the loading station at a rate greater than the rate at which the articles are removed at the unloading station 14. The removing of articles 28 from the conveyor 16 at the unloading station 14 is accomplished when the conveyor is stopped and they are removed from non-sequential article stations 18 thus allowing a substantial amount of articles 28, say fifty percent or more, to return to the loading station 12 on the conveyor 16.

There is further provided in the conveying method a secondary operation which is performed in the event the loading station 12 is inoperative to supply articles 28 to the continuous conveyor 16. In this event the intermittent movement of the conveyor is controlled by the unloading sequence at the unloading station. To accomplish this secondary operation there is located at the unloading station 14 a sensor 22 (FIG. 2) at the first preceding article station 46 sensor 23, and the second preceding article station 48 sensor 25. Sensor 22 detects the presence or absence of an article 28 in the unload station 14. Sensor 23 detects the presence or absence of an article 28 in the first preceding article station 46 and sensor 25 detects the presence or absence of an article 28 in the second preceding article station 48. With the sensors 22, 23, and 25 so located each time the endless conveyor 16 stops its movement the presence or absence of articles at the three stations 14, 46 and 48 are detected and a corresponding signal is sent to the electronic control device 24. The electronic control device selects as a function of the signals moving the conveyor so the next preceding article station is brought to the unloading station when an article is absent at the unloading station, and selecting, when an article is present at the unloading station, which one as between the article station at the unloading station and first immediately preceding article station thereto the article which will be unloaded when at the unloading station based on logic comprising: selecting the article of the unloading station when there is absence of an article at the first preceding article station, and selecting the article of one of the unloading station and first preceding article station when there is an article at the second preceding article station and selecting the other article of the unloading station and first preceding article station when there is an absence of an article at the second preceding article station. The selected article is then removed from the conveyor when it is at the unloading station.

The selection when an article is present at the unloading station as described above can be accomplished as demonstrated in the following two logic examples where in the first example:

x=unloading station
y=first preceding station
z=second preceding station
+=article present
−=article absent and the logic comprises selecting the article at the unloading station 14 when:

$$+x \pm y + z \text{ or}$$

$$+x - y - z$$

and selecting the article of the first preceding article station when:

$$+x + y - z.$$

In the second example, the logic comprises selecting the article at the unloading station 14 when:

$$+x - y \pm z \text{ and } +x + y - z$$

and selecting the article of the first preceding article station when:

$$+x + y + z.$$

With that logic the electronic control device will appropriately control the robot 40 and have it remove the selected article 28 at the unloading station 14 when the selected article is stopped at the unloading station 14. By this method there is intelligently selected which article to unload at the unloading station 14 in order to avoid large gaps between articles 28 on the conveyor 16 in the event that the loading station 12 is inoperative for some reason. Thus, while the reason for the inoperative loading station is being corrected the continuous conveyor 16 continues to intermittently move as described above and deliver accumulated articles 28 to the unloading station 14, however, the articles will not be in every article station 18 along the continuous conveyor 16 but will be dispersed along the conveyor 16 with only small gaps between the articles 28 which will still allow for articles 28 to be furnished for a considerable amount of time to the unloading station 14 without interruption of the assembly line requiring the articles 28 from the conveyor 16.

What is described above is the preferred method of combining the transfer of articles from a loading station to an unloading station and the accumulation of articles to avoid prolonged interruption operation of the unloading station in the event the loading station is inoperative. However, the method may be simplified by having only two sensors 22 and 23 for unloading station 14 and first preceding station 46 respectively. The operation of the conveying system according to this simplified method is the same as previously described except for the logic in which selection is made as to which one as between the article station at unloading station 14 and first immediately preceding article station 46 thereto the article is to be unloaded from when at the unloading station. The logic in this case is selecting the article 28 at the unloading station 14 when there is an article 28 at the unload station 14 and no article at the first preceding article station 46 and selecting the article 28 of the first preceding article station 46 when there is an article 28 both at the unload station 14 and the first preceding article station 46. The article selected is then removed at the unloading station 14 whenever the article selected stops at the unloading station 14. The disadvantage to this latter method relative to the preferred method is that there may be larger gaps between articles 28 on the continuous conveyor 16 when the loading station 12 is inoperative. Larger gaps mean that the amount of articles accumulated is less and therefore the amount of time that the loading station may be inoperative is shortened. As will be understood, it is possible that there can be more than three article sensors at the unloading station, however, more than three does not produce any appreciably improvement in the accumulation of articles on the endless conveyor and does complicate unnecessarily the logic for selecting the correct article for unloading at the unloading station.

While the specific embodiment and method of this invention has been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A method of combining the transfer of articles from a loading station to an unloading station and the accumulation of articles to avoid prolonged interrupted operation of the unloading station in the event the loading station is inoperative comprising:

a first primary operation including:
   (a) intermittently moving and stopping a continuous conveyor having a plurality of article stations between the loading and unloading stations,
   (b) placing articles on the conveyor at the loading station when the conveyor is stopped and there is no article on the conveyor at the loading station at a rate greater than the rate at which the articles are removed at the unloading station,
   (c) removing articles from non-sequential article stations of the conveyor when at the unloading station and the conveyor is stopped, and a secondary operation in the event the loading station is inoperative including:
   (a) intermittently moving and stopping the continuous conveyor between the loading and unloading stations,
   (b) sensing each time the conveyor stops the presence or absence of articles at the unloading station and at the first preceding article station before the unloading station and sending a corresponding signal to a electronic control device,
   (c) selecting as a function of the signals:
      (i) moving the conveyor to bring the next preceding article station to the unloading station when an article is absent at the unloading station, and
      (ii) selecting when an article is at the unloading station which one as between the article station at the unloading station and first immediately preceding article station thereto the article to be unloaded from the article station when at the unloading station based on the logic of selecting the article at the unloading station when there is an article at the unloading station and no article at the first preceding article station and selecting the article of the first preceding station when there is an article at the unloading station and the first preceding article station, and
   (d) removing the selected article when at the unloading station.

2. The method of claim 1 including during the first primary operation placing an article in every article station that does not have an article when the empty article stations are at the loading station.

3. The method of claim 1 wherein removing articles from non-sequential article stations when at the unloading station is at a rate allowing at least fifty percent of the articles to return to the loading station during the first primary operation.

4. The method of claim 1 wherein the intermittently moving and stopping of the conveyor is controlled by the loading sequence at the loading station when that station is operative and by the unloading sequence at the unloading station when the loading station is inoperative.

5. The method of claim 1 wherein a programmed robot is utilized in placing the articles on the conveyor at the loading station.

6. The method of claim 5 wherein a programmed robot is utilized in removing articles from the conveyor at the unloading station and said robot is operated independent of the loading station robot.

7. A method of combining the transfer of articles from a loading station to an unloading station and the accumulation of articles to avoid prolonged interrupted operation of the unloading station in the event the loading station is inoperative comprising:

a first primary operation including:
   (a) intermittently moving and stopping a continuous conveyor having a plurality of article stations between the loading and unloading stations,
   (b) placing articles on the conveyor at the loading station when the conveyor is stopped and there is no article on the conveyor at the loading station at a rate greater than the rate at which the articles are removed at the unloading station,
   (c) removing articles from non-sequential article stations of the conveyor when at the unloading station when the conveyor is stopped, and a secondary operation in the event the loading station is inoperative including:
   (a) intermittently moving and stopping the continuous conveyor between the loading and unloading stations,
   (b) sensing each time the conveyor stops the presence or absence of articles at the unloading station, at the first preceding article station before the unloading station, and the second preceding article station before the unloading station, and sending a corresponding signal to an electronic control device,
   (c) selecting as a function of the signals:
      (i) moving the conveyor to bring the next preceding article station to the unloading station when an article is absent at the unloading station, and
      (ii) selecting when an article is present at the unloading station which one as between the article station at the unloading station and first immediately preceding article station thereto the article to be unloaded from the article station when at the unloading station based on logic comprising:

selecting the article at the unloading station when there is absence of an article at the first preceding article station, selecting the article of one of the unloading station and first preceding article station when there is an article at the second preceding article station and selecting the other article of the unloading station and first preceding article station when there is an absence of an article at the second preceding article station, and (d) removing the selected article when at the unloading station.

8. The method of claim 7 including during the first primary operation placing an article in every article station that does not have an article when the empty article stations are at the loading station.

9. The method of claim 7 wherein removing articles from non-sequential article stations when at the unloading station is at a rate allowing at least fifty percent of the articles to return to the loading station during the first primary operation.

10. The method of claim 7 wherein the intermittently moving and stopping of the conveyor is controlled by the loading sequence at the loading station when that station is operative and by the unloading sequence at the unloading station when the loading station is inoperative.

11. A method of combining the transfer of articles from a loading station to an unloading station and the accumulation of articles to avoid prolonged interrupted operation of the unloading station in the event the loading station is inoperative comprising:

a first primary operation including:
 (a) intermittently moving and stopping a continuous conveyor having a plurality of article stations between the loading and unloading stations,
 (b) placing articles on the conveyor at the loading station when the conveyor is stopped and there is no article on the conveyor at the loading station at a rate greater than the rate at which the articles are removed at the unloading station,
 (c) removing articles from non-sequential article stations of the conveyor when at the unloading station when the conveyor is stopped, and a secondary operation in the event the loading station is inoperative including:
 (a) intermittently moving and stopping the continuous conveyor between the loading and unloading stations,
 (b) sensing each time the conveyor stops the presence or absence of articles at the unloading station, at the first preceding article station before the unloading station, and the second preceding article station before the unloading station, and sending a corresponding signal to an electronic control device,
 (c) selecting as a function of the signals:
  (i) moving the conveyor to bring the next preceding article station to the unloading station when an article is absent at the unloading station, and
  (ii) selecting when an article is present at the unloading station which one as between the article station at the unloading station and first immediately preceding article station thereto the article to be unloaded from the article station when at the unloading station based on the logic where:
   x = unloading station
   y = first preceding article station
   z = second preceding article station
   + = article present
   − = article absent
  said logic comprising: selecting the article at the unloading station when, $+x-y\pm z$ and $+x+y-z$ and selecting the article of the first preceding article station when, $+x+y+z$ (d) removing the selected article when at the unloading station.

12. The method of claim 11 including during the first primary operation placing an article in every article station that does not have an article when the empty article stations are at the loading station.

13. The method of claim 11 wherein removing articles from non-sequential article stations when at the unloading station is at a rate allowing at least fifty percent of the articles to return to the loading station during the first primary operation.

14. The method of claim 11 wherein the intermittently moving and stopping of the conveyor is controlled by the loading sequence at the loading station when that station is operative and by the unloading sequence at the unloading station when the loading station is inoperative.

15. The method of claim 11 wherein a programmed robot is utilized in placing the articles on the conveyor at the loading station.

16. The method of claim 11 wherein a programmed robot is utilized in removing articles from the conveyor at the unloading station and said robot is operated independent of the loading station robot.

17. A method of combining the transfer of articles from a loading station to an unloading station and the accumulation of articles to avoid prolonged interrupted operation of the unloading station in the event the loading station is inoperative comprising:

a first primary operation including:
 (a) intermittently moving and stopping a continuous conveyor having a plurality of article stations between the loading and unloading stations,
 (b) placing articles on the conveyor at the loading station when the conveyor is stopped and there is no article on the conveyor at the loading station at a rate greater than the rate at which the articles are removed at the unloading station,
 (c) removing articles from non-sequential article stations of the conveyor when at the unloading station when the conveyor is stopped, and a secondary operation in the event the loading station is inoperative including:
 (a) intermittently moving and stopping the continuous conveyor between the loading and unloading stations,
 (b) sensing each time the conveyor stops the presence or absence of articles at the unloading station, at the first preceding article station before the unloading station, and the second preceding article station before the unloading station, and sending a corresponding signal to an electronic control device,
 (c) selecting as a function of the signals:
  (i) moving the conveyor to bring the next preceding article station to the unloading station when an article is absent at the unloading station, and (ii) selecting when an article is present at the unloading station which one as between the article station at the unloading station and first immediately preceding article station thereto the article to be unloaded from the article station when at the unloading station based on the logic where:
x = unloading station
y = first preceding article station
z = second preceding article station
+ = article present
− = article absent
said logic comprising: selecting the article of the unloading station when, $$+x\pm y+z \text{ or } +x-y-z$$

and selecting the article of the first preceding article station when, $$+x+y-z$$

(d) removing the selected article when at the unloading station.

18. The method of claim 17 including during the first primary operation placing an article in every article station that does not have an article when the empty article stations are at the loading station.

19. The method of claim 17 wherein removing articles from non-sequential article stations when at the unloading station is at a rate allowing at least fifty percent of the articles to return to the loading station during the first primary operation.

20. The method of claim 17 wherein the intermittently moving and stopping of the conveyor is controlled by the loading sequence at the loading station when that station is operative and by the unloading sequence at the unloading station when the loading station is inoperative.

21. The method of claim 17 wherein a programmed robot is utilized in placing the articles on the conveyor at the loading station.

22. The method of claim 17 wherein a programmed robot is utilized in removing articles from the conveyor at the unloading station and said robot is operated independent of the loading station robot.

23. An article accumulator and transfer system for the transfer of articles from a loading station to an unloading station and the accumulation of articles to avoid prolonged interrupted operation of the unloading station in the event the loading station is inoperative comprising:
means for performing a first primary operation including:
(a) means for intermittently moving and stopping a continuous conveyor having a plurality of article stations between the loading and unloading stations,
(b) means for placing articles on the conveyor at the loading station when the conveyor is stopped and there is no article on the conveyor at the loading station at a rate greater than the rate at which the articles are removed at the unloading station,
(c) means for removing articles from non-sequential article stations of the conveyor when at the unloading station and the conveyor is stopped, and
means for performing a secondary operation in the event the loading station is inoperative including:
(a) means for intermittently moving and stopping the continuous conveyor between the loading and unloading stations,
(b) means sensing each time the conveyor stops the presence or absence of articles at the unloading station and at the first preceding article station before the unloading station and sending a corresponding signal to a electronic control device,
(c) means responsive to signals:
(i) for moving the conveyor to bring the next preceding article station to the unloading station when an article is absent at the unloading station, and
(ii) for selecting when an article is at the unloading station which one as between the article station at the unloading station and first immediately preceding article station thereto the article to be unloaded from the article station when at the unloading station based on the logic of selecting the article at the unloading station when there is an article at the unload station and no article at the first preceding article station and selecting the article of the first preceding article station when there is an article at the unloading station and the first preceding article station, and
(d) means for removing the selected article when at the unloading station.

24. An article accumulator and transfer system for the transfer of articles from a loading station to an unloading station and the accumulation of articles to avoid prolonged interrupted operation of the unloading station in the event the loading station is inoperative comprising:
means for performing a first primary operation including:
(a) means for intermittently moving and stopping a continuous conveyor having a plurality of article stations between the loading and unloading stations,
(b) means for placing articles on the conveyor at the loading station when the conveyor is stopped and there is no article on the conveyor at the loading station at a rate greater than the rate at which the articles are removed at the unloading station,
(c) means for removing articles from non-sequential article stations of the conveyor when at the unloading station when the conveyor is stopped, and
means for performing a secondary operation in the event the loading station is inoperative including:
(a) means for intermittently moving and stopping the continuous conveyor between the loading and unloading stations,
(b) means sensing each time the conveyor stops the presence or absence of articles at the unloading station, at the first preceding article station before the unloading station, and the second preceding article station before the unloading station, and sending a corresponding signal to an electronic control device,
(c) means responsive to the signals:
(i) for moving the conveyor to bring the next preceding article station to the unloading station when an article is absent at the unloading station, and
(ii) for selecting when an article is present at the unloading station which one as between the article station at the unloading station and first immediately preceding article station thereto the article to be unloaded from the article station when at the unloading station based on logic comprising:
  selecting the article at the unloading station when there is absence of an article at the first preceding article station,
  selecting the article of one of the unloading station and first preceding article station when there is an article at the second preceding article station and selecting the other article of the unloading station and first preceding article station when there is an absence of an article at the second preceding article station, and
(d) means removing the selected article when at the unloading station.

25. An article accumulator and transfer system for the transfer of articles from a loading station to an unloading station and the accumulation of articles to avoid prolonged interrupted operation of the unloading station in the event the loading station is inoperative comprising:
means for performing a first primary operation including:
  (a) means for intermittently moving and stopping a continuous conveyor having a plurality of article stations between the loading and unloading stations,
  (b) means for placing articles on the conveyor at the loading station when the conveyor is stopped and there is no article on the conveyor at the loading station at a rate greater than the rate at which the articles are removed at the unloading station,
  (c) means for removing articles from non-sequential article stations of the conveyor when at the unloading station when the conveyor is stopped, and
means for performing a secondary operation in the event the loading station is inoperative including:
  (a) means for intermittently moving and stopping the continuous conveyor between the loading and unloading stations,
  (b) means for sensing each time the conveyor stops the presence or absence of articles at the unloading station, at the first preceding article station before the unloading station, and the second preceding article station before the unloading station, and sending a corresponding signal to an electronic control device,
  (c) means responsive to the signals:
    (i) for moving the conveyor to bring the next preceding article station to the unloading station when an article is absent at the unloading station, and
    (ii) for selecting when an article is present at the unloading station which one as between the article station at the unloading station and first immediately preceding article station thereto the article to be unloaded from the article station when at the unloading station based on the logic where:
  x = unloading station
  y = first preceding article station
  z = second preceding article station
  + = article present
  − = article absent
    said logic comprising: selecting the article of the unloading station when, $+x \pm y+z$ or $+x-y-z$ and selecting the article of the first preceding article station when, $+x-y \pm z$ and $+x+y-z$ and selecting the article of the first preceding article station when, $+x+y+z$ (d) means for removing the selected article when at the unloading station.

26. An article accumulator and transfer system for the transfer of articles from a loading station to an unloading station and the accumulation of articles to avoid prolonged interrupted operation of the unloading station in the event the loading station is inoperative comprising:
means for performing a first primary operation including:
  (a) means for intermittently moving and stopping a continuous conveyor having a plurality of article stations between the loading and unloading stations,
  (b) means for placing articles on the conveyor at the loading station when the conveyor is stopped and there is no article on the conveyor at the loading station at a rate greater than the rate at which the articles are removed at the unloading station,
  (c) means for removing articles from non-sequential article stations of the conveyor when at the unloading station when the conveyor is stopped, and
means for performing a secondary operation in the event the loading station is inoperative including:
  (a) means for intermittently moving and stopping the continuous conveyor between the loading and unloading stations,
  (b) means for sensing each time the conveyor stops the presence or absence of articles at the unloading station, at the first preceding article station before the unloading station, and the second preceding article station before the unloading station, and sending a corresponding signal to an electronic control device,
  (c) means for selecting as a function of the signals:
    (i) moving the conveyor to bring the next preceding article station to the unloading station when an article is absent at the unloading station, and
    (ii) selecting when an article is present at the unloading station which one as between the article station at the unloading station and first immediately preceding article station thereto the article to be unloaded from the article station when at the unloading station based on the logic where:
  x = unloading station
  y = first preceding article station
  z = second preceding article station
  + = article present
  − = article absent
    said logic comprising: selecting the article of the unloading station when, $+x \pm y+z$ or $+x-y-z$ and selecting the article of the first preceding article station when, $+x+y-z$ (d) means for removing the selected article when at the unloading station.

* * * * *